United States Patent [19]

Cho, Yu H.

[11] Patent Number: 4,695,487

[45] Date of Patent: Sep. 22, 1987

[54] PROCESS FOR COLORING GRANITE

[76] Inventor: Cho, Yu H., 1169-23, Choryang-Dong, Dong-Gu, Busan-Shi, Rep. of Korea

[21] Appl. No.: 875,214

[22] Filed: Jun. 17, 1986

[30] Foreign Application Priority Data

Apr. 14, 1986 [KR] Rep. of Korea .................. 86-2808

[51] Int. Cl.⁴ ........................... B05D 3/02; C14L 9/00
[52] U.S. Cl. .................................. 427/294; 427/299; 427/374.1; 427/387; 427/393.6; 428/540
[58] Field of Search ................ 427/294, 299, 376.2, 427/387, 393.6, 374.1; 428/540, 702

[56] References Cited

U.S. PATENT DOCUMENTS 3,704,159 11/1972 Sayre .................................. 428/540
4,273,813 6/1980 Meddaugh .................... 427/393.6 X
4,520,051 5/1985 Harrison ...................... 427/393.6 X
4,620,989 11/1986 Stiegler ........................... 427/294 X

*Primary Examiner*—Lusignan, Michael R.
*Attorney, Agent, or Firm*—Birch, Stewart, Kolasch & Birch

[57] ABSTRACT

A process for coloring granite a which comprises dissolving in a solvent a metallic salt formed by reacting a metal with a strong acid to form a solution, introducing the solution to a vacuum container charged with granite to permeate the solution into the granite, developing color by heating the permeated granite in a heating furnace maintained at temperatures in the range from 250° C. to 300° C. for 2 to 3 hours, cooling down to room temperature, and finally surface-treating the colored granite with silicone oil.

5 Claims, No Drawings

PROCESS FOR COLORING GRANITE

BACKGROUND OF THE INVENTION

The present invention relates to a process for coloring granite which comprises permeating a colorant solution into granite followed by heating the granite to display gorgeous colors quite similar to those of native granite.

Granite colored in accordance with the process described above has gorgeous colors as well as excellent physical properties than native granite in terms of resistance to various factors such as water, weathering and impact, and has, in particular, no tendency to discoloration, resulting in fast color.

Granite, one of hard rocks, originally consisting of rock forming minerals such as feldspar, quartz, mica, pyroxene, amphibole, and so on is classified by its color into five of them such as white granite containing major proportions muscovite, black granite containing biotite as major mineral, red granite containing feldspar with approximately one percent of ferric oxide, brown granite containing brown substance created by rock weathering of the red granite, which, however, does not meet the demand due to its slight production, and greyish white granite which has been produced on massive commercial scale for decorative construction materials.

Coloration of granite according to the present invention can be applied to ordinary stone. However, according to one aspect of the present invention, there is provided a process for preparing colored granites by using greyish white and/or white granite.

Conventional process of coloring stone comprises dissolving an inorganic or organic pigment in solvent, subjecting the stone to physical treatments under pressure to soak or permeate the pigment solution into voids or gaps of the stone, and drying to develop pigment color in the stone itself.

This process has some disadvantages in the fact that the colorants or pigments are decomposed by heat or sunlight or easily leached out by water, resulting in discoloration which consequently may cause loss of its original color of the colorant or pigment.

Other conventional process has been carried out by treatment of stone or rock crystal at high temperatures to expand surface voids or gaps to provide easy permeation of colorant or pigment thereinto for improving coloration efficiency.

This kind of process, however, provides the products with potential discoloration and remarkable deterioration of physical properties such as weathering resistance, water resistance and impact resistance.

Another process discloses impregnation of pigment blended with thermosetting resin solution. This process creates poor impregnation only to provide surface coating as well as loss of natural beauty.

SUMMARY OF THE INVENTION

Unlike cenventional processes described above, the present invention has been based on the fact that studies on the coloration of naturally occurring rocks have given some clues for the coloration wherein metallic constituents contained in rocks are oxidized by external or internal factors to develop color, from which processes are derived for retaining metallic oxides in rocks.

As stated above, white granite contains major proportions of muscovite which is, in turn, rich in aluminum oxide, and red granite contains feldspar having approximately one percent of ferric oxide, from which color is developed in individual granites.

Direct permeation of metallic oxides is almost impossible because these oxides are not soluble in water or solvents. Therefore, main aspect of the present invention lies in coloration by metallic oxides wherein the oxidation of such metallic salts should be carried out after permeation of their solution comprising water or other solvents into substrate granite.

DETAILED DESCRIPTION AND PREFERRED EMBODIMENT

A process of the present invention is explained in detail hereinafter.

Metal is first reacted with a strong acid such as nitric acid, sulfuric acid and hydrochloric acid to obtain a metallic salt of the corresponding acid.

The metallic salt is dissolved in water or solvent which has already been mixed with a pinch of surface active agent. The metallic salt solution thus obtained is charged to a vacuum container having granite therein to permeate it into the granite.

Treated granite is then heated at temperatures in the range of 250° C. to 300° C. for 2-3 hours under oxidizing atmosphere in a heating furnace to increase the formation of metallic oxides necessary for the color development.

As described above, metal elements which develop individual colors after oxidation include iron, manganese, copper, nickel, cobalt, lead, chromium, aluminum, and so on. Metallic salts suitable for the present invention include reaction products of strong acids such as nitric acid, sulfuric acid and hydrochloric acid, and so on with those metals indicated above. These metallic salts are generally soluble in water and organic solvents of high volatility such as lower alkanes, lower alkanols, esters, ethers. Among others, water or lower alcohols are most preferable.

For example, iron nitrate is easily soluble in water, alcohols, acetone, and such while iron sulfate is slightly soluble in water to the extent that it should be dissolved in other solvents prior to permeation into rocks.

Nitrates of manganese, cobalt, chromium, lead, silver, nickel and so on which are obtained in accordance with the same process as mentioned above are easily soluble in alcohols and water to form a sol phase. Consequently, water or lower alcohols can be used as permeating solvent.

However, chromium sulfate, lead sulfate, and such are insoluble in water. Therefore, these salts should be dissolved thoroughly in acid solution prior to permeation, and lead choride or chromium chloride should be dissolved in ammonium chloride or acid solutions to obtain a sol phase which is to be permeated.

The present invention can facilitate permeation of the metallic salts into voids or gaps, capillary tubes created by irregular plate, pillar and sphere joints, cracked textures of crystalline and noncrystalline rock structures in their aggregation pattern of rock forming minerals, including stratification bedding and schistosity.

Water absorption characteristics which may be affected by origin of production and properties of the granite render possible soaking of the solution of metallic salts. Means to increase permeation effect can be worked by maintaining the temperature of solution at 60° C. to increase the solubility for reducing the viscosity, adding a pinch of surface active agent to improve washability, diffusion and impregnation effects, and evacuating the container having substrate granite under vacuum after introduction of the solution for better impregnation.

Furthermore, in the heat treatment stage of the present invention metallic salt permeated into the granite is decomposed by heat and metallic oxide is gradually accumulated within the granite for certain periods of time to eventually develop thick color and decomposed gas is liberated out of the substrate granite.

For example, decomposed $Fe_2(SO_4)_3$ remains in the form of ferric oxide ($Fe_2O_3$) within the granite and $SO_3$ gas is released out of the granite. In addition, $Fe(NO_3)_3$ decomposes into $Fe_2O_3$ which eventually remains within the granite to develop red color and decomposed nitrogen oxide is liberated from the granite.

In the heat treatment stage care must be taken to start heating at low temperatures and gradually increase the temperature up to the range from 250° C. to 300° C.

Temperature should be maintained in the range just mentioned above for reasonable periods of time and thereafter gradually cooled to room temperature.

Necessity of this operation aims at preventing rock itself from being cracked during the heat treatment stage and from decrease in strength.

Heat-treated granite is finally dipped in or surface-treated with silicone oil to block capillary tubes connecting the inside with the surface of the granite, including fine gaps or voids created in the surface of the granite for preventing deterioration of the permeated substances, increasing resistance to weathering of the colored products and suppressing whitening effect by migration of calcium oxide contained in the granite to the surface.

In an effort to more fully illustrate the operation of this invention, the following detailed Examples are provided. The examples are illustrative only and are not intended to limit the scope of the invention in any way.

EXAMPLE 1

Iron (56 kg) was thoroughly reacted with 60% nitric acid solution (315 kg) at room temperature to complete evolution of hydrogen gas and then let it stand for several hours to precipitate greyish white crystalline product. The precipitate thus obtained was collected by decantation and then evaporated to dryness. The residue was taken up in sufficient quantity of distilled water added with a pinch of surface active agent to obtain sol-like solution which was then charged to a coloration reactor. To this reactor placed a greyish white granite specimen (20 mm×400 mm×400 mm), permeated the solution into the granite specimen under vacuum for four hours, and then removed the specimen from the reactor.

The specimen was indirectly heated at the temperatures ranging from 200° C. to 250° C. for 90 min. to 120 min. to develop gorgeous color all over the granite specimen. This procedure was repeated several times to develop necessary red color.

Cross-section of the colored granite specimen showed a uniform red tint progressed to 10 mm deep from the surface of the specimen. Granite thus colored was sufficiently coated with silicone oil to block voids or gaps in the surface to obtain a finished product.

EXAMPLE 2

Procedure of Example 1 was repeated using a greyish white granite (20 mm×40 mm×400 mm) except that iron was replaced by manganese (55 kg) and 60% sulfuric acid solution (163.4 kg) was used instead of 60% nitric acid solution.

Uniform black tint progressed to 10 mm deep was observed.

EXAMPLE 3

Procedure of Example 1 was repeated using a greyish white granite specimen (20 mm×400 mm×400 mm) to obtain a cobaltic product except that iron was replaced by cobalt (59 kg) and 60% nitric acid solution (121.6 kg) was used.

Uniform cobalt tint progressed to 10 mm deep was observed.

EXAMPLE 4

Procedure of Example 1 was prepared using a greyish white granite specimen (20 mm×400 mm×400 mm) to obtain a gorgeous yellow product except that iron was replaced by lead (207 kg) and 60% nitric acid solution (210 kg) was used.

Uniform yellow tint progressed to 10 mm deep was observed.

EXAMPLE 5

Procedure of Example 1 was repeated using a greyish white granite specimen (20 mm×400 mm×400 mm) to obtain a green product except that iron was replaced by copper (64 kg) and 60% nitric acid solution (210 kg) was used.

Uniform green tint progressed to 10 mm deep was observed.

EXAMPLE 6

Procedure of Example 1 was repeated using a greyish white granite specimen (20 mm×400 m×400 mm) to obtain a black product except that iron was replaced by silver (108 kg) and 60% hydrochloric acid solutin (60.8 kg) was used.

Uniform black tint progressed to 10 mm deep was observed.

EXAMPLE 7

Test specimens (10 cm×10 cm×20 cm) were prepared from the colored products of the previous examples.

Test specimens were dried at 105° C.–110° C. in an air-drying oven until constant weight was obtained and then cooled. These test specimens were dipped in water for 48 hours with 1 mm upper portion of the specimen exposed to the air in a constant-temperature cabinet maintained at 20°±3° C. with high humidity.

Treated specimens were placed on a compressive strength testing apparatus equipped with a sphere-contacting plane. Load of 10 kgf (98N)/cm² was vertically applied on the specimens.

Compressive strength was calculated by an equation as follows and the results on an average for three tests were repeated.

$$\text{Compressive Strength (kgf/cm}^2\text{)} = \frac{\text{Maximum load (kgf/cm}^2\text{)}}{\text{Cross-Sectional area of specimen (cm}^2\text{)}}$$

Averaged compressive strength was 748 kg/cm² from which the products were found to be excellent quality. (The results were officially certified on May 22, 1985 by the Pusan Industrial Testing Institute, Republic of Korea)

EXAMPLE 8

Four test specimens (100 mm × 200 mm × 18 mm) for weathering resistance test and two (300 mm × 300 mm × 18 mm) for flexural strength test were randomly sampled from the products prepared by the previous examples.

Test specimens were placed in a testing bath maintained at 20° C. with 60% humidity for more than 24 hours and then tested according to the methods shown in Table 1.

TABLE 1

| Item | Testing Methods Testing Method |
|---|---|
| Weathering Resistance | JIS-A-1415 (Testing method for accelerated resistance to weathering of plastics construction materials): Exposure time: 100 hours |
| Flexural Strength | JIS-A-5415, Section 6.3 |

Results of weathering resistance tests are shown in Table 2 while those of flexural strength tests are given in Table 3.

TABLE 2

| Item | Test Specimen No. | Result |
|---|---|---|
| Resistance to weathering | 1 2 3 4 | Degree of color change of four specimens evaluated in accordance with Section 4.2.1 (1) of JIS-A-1411 (Evaluation Method of Weathering Resistance of plastics Construction Materials) was found to be Grade 4 or 5. Surface roughness, residual hairlines and cracks of the specimens were not shown. |

TABLE 3

| Results of Flexural Strength Tests | | | | |
|---|---|---|---|---|
| | | Test Specimen No. | | |
| | | 1 | 2 | Average |
| Width, mm | 1 | 300.0 | 300.0 | |
| | 2 | 299.9 | 299.9 | |
| | 3 | 299.8 | 299.8 | |
| | Average | 299.9 | 299.9 | |
| Thickness, mm | 1 | 19.2 | 18.6 | |
| | 2 | 19.4 | 18.4 | |
| | 3 | 19.6 | 18.5 | |
| | Average | 19.4 | 18.5 | |
| Flexural Breaking Load | | 319 | 185 | 252 |

TABLE 4

| Grade | Evaluation Standard | Remark Color difference of color magnitude diagram of grey scale |
|---|---|---|
| 1 | Color change Corresponding to No. 1 of grey scale for assessing change in color, or exceeding the limit | 12 NBS units |
| 2 | Equivalent to No. 2. of grey scale | 6 NBS units |
| 3 | Equivalent to No. 3 of grey scale | 3 NBS units |
| 4 | Equivalent to No. 4 of grey scale | 1.5 NBS units |
| 5 | Equivalent to No. 5 of grey scale | 0 NBS unit |

As mentioned above, coloration process of rocks by the present invention does not employ direct permeation of metallic oxides which are almost impossible to soak into substrate rocks, but utilizes metallic salts as permeating agent which are quite easy to permeate into the substrate rocks prior to fixation of metallic oxides within the rocks.

Furthermore, the present invention has advantageous aspect of developing individual colors of metallic oxides having stability to sunlight, heat, water and other surrounding factors.

What is claimed is:

1. A process for coloring a granite which comprises the steps of
   dissolving in a solvent a metallic salt formed by reacting a metal with a strong acid to form a solution,
   introducing said solution to a vacuum container charged with the granite to permeate said solution into said granite,
   developing color by heating said permeated granite in a heating furnace maintained at temperature in the range from 250° C. to 300° C. for 2 or 3 hours,
   cooling down to room temperature, and
   finally surface-treating the colored granite with a silicone oil.

2. The process of claim 1, wherein the metal is a member selected from the group consisting of iron, manganese, cobalt, chromium, copper, nickel, lead and silver.

3. The process of claim 1, wherein the strong acid is a member selected from the group consisting of nitric acid, sulfuric acid and hydrochloric acid.

4. The process of claim 1, wherein the solvent is a member selected from the group consisting of water and organic solvent.

5. The process of claim 4, wherein the organic solvent is lower alcohols.

* * * * *